8681X
Caton & Rives.
Registering Appa's for Print'g Press.
No. Patented Mar. 11. 1835.
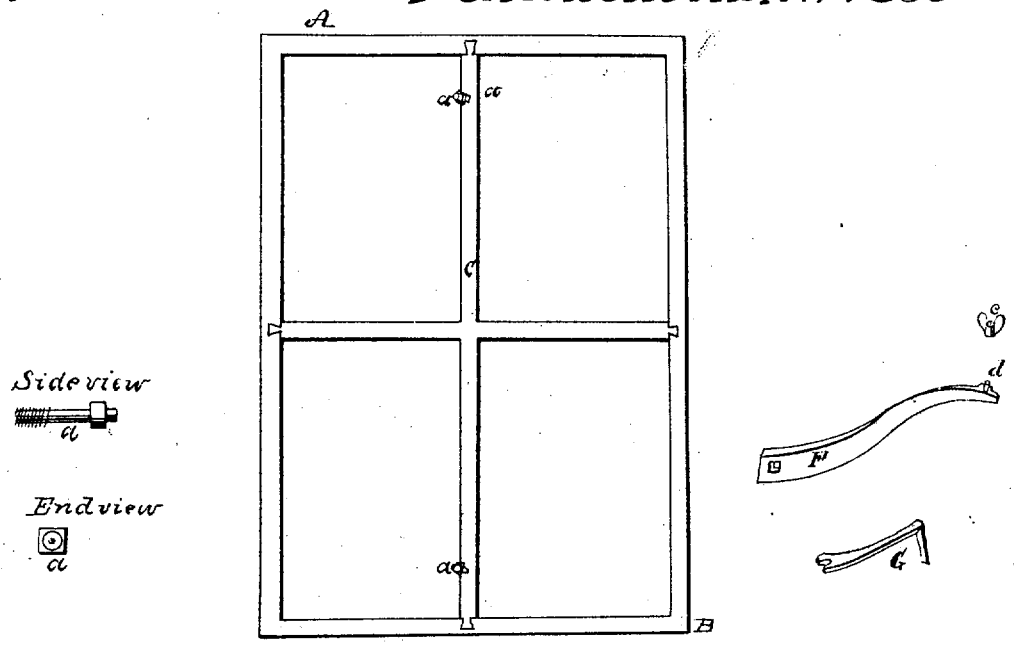
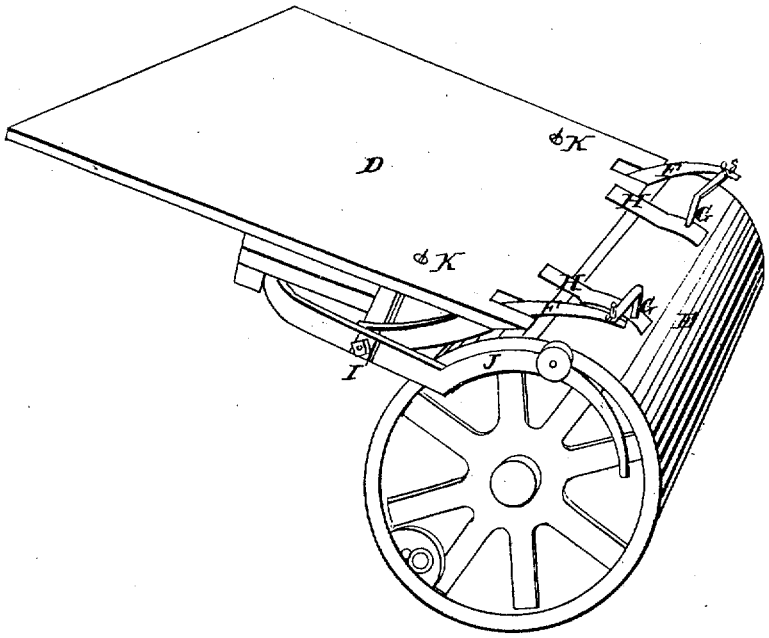

Michael Caton and John C. Rives of Washington D.

Letters Patent

The Schedule referred to in these Letters Patent and making part of the same containing a description in the words of the said Michael Caton and John C. Rives themselves of their improvement in printing on a Napier Printing Press.

To all to whom these presents shall come. Be it known that we Michael Caton and John C. Rives of the City of Washington in the District of Columbia have invented a new and useful improvement in printing on a Napier Printing Press. whereby what is termed by Printers Register may be made perfect on it. - that is the printing on the side of the sheet first worked off completely covered when it is backed or printed on the other side, or in other words the two printed pages on each leaf of a book made exactly opposite to each other. A full description of the improvement made by us follows.

1st Place two points above the Cylinder (or Cylinders if it be a double Napier Press) so near to it that a sheet will not pass between them and the cylinder when putting it on and at such places that the foremost corners of the sheet when rightly laid on will rest against these points. The points are to be geared to the shaft of the registering apparatus now in use so that it will raise them just at the moment the fingers of the press take hold on the sheet and keep them raised until the sheet passes from under them; and the instant that is done, drop to the position first named, that is so near the cylinder that a sheet cannot pass between it and the points. If the paper is all the same size by putting every sheet against these points and the guide at the sides all the margins of the printed sheet will be the same size, which is the principal object for using them. See the drawing of perspective view of Cylinder &c of E represents the cylinder F. the arms of the points by which they are geared to the shaft that works the points. H. [illegible]

of leather upon which the points rest. (The end of the shaft has [illegible]
the arms of the points are geared. 2^d Make two Screws, and on the
head of each the letter c, must and it is on a type and about the size of
<u>long primer</u>. a Screw these into one of the cross bars of the chase so
that their heads shall be just as high as the type locked up in it, &
at such places that they will make an impression upon the
printed sheet about an inch from each edge of it. In working
off the first side these screws will make impressions on any sheet
that may be seen distinctly when the paper is turned to work off the
second side. The Cylinders of a double Napier Press fall a little
when passing over the cross bar in working a form on it, therefore the
heads of the screws should not be quite so high as the type, because
if they are they will frequently make a hole through the paper which
should not be done. The screws should be so regulated that their
heads will make about the same impressions as are made by the
type. See drawing of . . chase and size of the screws. [illegible] repre-
sents the cross bar of the chase and c.c. the screws.

3^d Place on the inclined board upon which the sheet is laid to
be taken off by the fingers of the press two movable points just the
distance apart as the screws in the chase are. These points should
rise about one fourth of an inch above the board. In working off
the second side put the centre of the c made on the paper by the
screws in the chase in working off the first side, exactly over these
points and move them whichever way may be necessary <u>until the</u>
form will make register on the sheet when it is taken off by
the fingers of the Press. It will require a boy on each side of the
Press to lay on the sheet when working off the second side.

Two or three weeks practice will enable two boys to lay on 25 sheets
a minute, which are as many as can be worked off within that
time by a single cylinder. In working off the second side the points
that rise and fall which have been [illegible] sometimes may be used instead
of those above mentioned, when the points that rise and fall are used
they should be stuck through the sheet in the centre of the c made by the heads of the Screws when printing the first Side. We think
the points that rise and fall are preferable to those which do not,
because a glance at the printed Sheets will Show the Superintendent
of the Press whether the Sheets have been laid on correctly. If the
Point Shattered have made holes in the Sheets through the centre
of the o then it is certain that the Sheets have not been laid on
correctly; but if they have been Struck through the centre of the o
and the form does not make register it proves that the Sheets have not
been laid on as they should be and that the points should be moved
See drawing denominated "Perspective view of the cylinder &c." D
represents the inclined board upon which the Sheets are laid and
k k the points. We now proceed to Show that the Several description
of inventions mentioned in this Specification are improvements at
least if indeed some of them may not properly be Styled original
inventions. First as to the advantages obtained by using points above
the cylinder. They enable the Printer when the paper is all the
same Size to make all the margins the Same Size which is very
desirable when it is necessary to bind the works, and especially when
the edges are not to be cut. Besides it is more easy to lay the sheets
when they are used; and they prevent the Sheets being laid too far
down, which spoils them when the margins are Small. With the
aid of these points alone good register may be made on newspaper
which is important when they are to be bound. Second. Of the
Screws in the Chase. They make an unerring mark on the Sheet
when printing the first Side to point by in printing the Second
Side. This is done too without the least detention or trouble, and
it requires but one person to a cylinder to lay on the Sheets; where-
as all the other modes of making register at a Napier Press require
two persons to a cylinder to lay on the Sheets when laying them
on to print the first Side. The most approved plan heretofore used
was to point the Sheets when laying them on to print the first Side,
and to point through the holes made in the Sheets in printing the
first Side, when printing the Second Side. There are two objections to [illegible] much are [illegible] or remedied by using the Screws in the
chase, First the points being moveable are often moved by accident which
prevents register being made on those Sheets that are printed while the
points are so moved, Second The sheet frequently slips after being prin-
ted before it gets on the form, which also prevents register being made, if
indeed it does not spoil the Sheet entirely. When Screws in the chase
are used they invariably make marks on the Sheet in printing the
first side at each place that perfect register will be made in prin-
-ting the Second Side if the Sheet is correctly pointed even if it has
Slipped in printing the first Side either before or after the fingers of the
press took hold of it. Third the points on the inclined board. As these
we recommend were not invented by us we deem it unnecessary to say
any thing about them here, except that by using those with our improvements
Perfect register may be made. The above Specification of the improve-
ments which we have made in printing on a Napier Press is we believe
so full that it will enable any person Skilled in the art or
Science of which it is a branch or with which it is most nearly con-
-nected, to make compound and use the Same which the law requires,
We have used the Screws in the chase about a year and the points
in front of the inclined board, five or six months and we deem them
so useful and necessary that we would not forego the use of them, for
one thousand Dollars a year if we had as much book work as we
could print on a double Napier Press. We beg leave to file herewith the Congressional
Globe dated the 19 January 1835, which was printed on a double
Napier Printing Press with our improvements attached to it, It will
show the impressions which the Screws make on the paper in printing
the first Side, also the point holes made through the paper in printing
the second Side, The Register is not perfect on this Sheet, which is
owing as will be seen to not pointing through the centre of the [illegible] made
by the screws. We think it proper to say in conclusion that we con-
sider the screws in the chase the greatest improvement we have made
and the one most easy to get round or evaded by those who might wish
to use it without paying for it, and therefore we deem it necessary to state 8681X  5 4 some of the modes by which evasions might be attempted. Types or figures of metal of the same height might be locked up in the chase near to a cross bar or they might be put into or near the side or end sticks or locked up in some other part of the form so as to answer the purpose of the screws though they would not do so well. Believing that no person before us has ever attempted to make register by making a mark upon the sheet with any thing connected with the chase we claim the exclusive right of doing so; and shall consider each and every attempt of the kind by any other person or persons without our permission as an infringement upon our rights. — In testimony that the above is a true Specification of our said improvement we have hereunto subscribed our names the 4th day of February 1835.

Witnesses
J. H. Mosell }
Ign. Mudd }

Michael Caton
John C Rives (Drawing)

(1930 Words) (Received & Recorded anew March 3rd 1837.)